United States Patent [19]

Marschner et al.

[11] 4,399,532

[45] Aug. 16, 1983

[54] METHODS OF AND SYSTEMS FOR MONITORING A FIRST CALL CONNECTION WHILE EFFECTING THE ESTABLISHMENT OF A SECOND CALL CONNECTION

[75] Inventors: Jamie J. Marschner, Denver; Rodney R. Maxon, Boulder, both of Colo.

[73] Assignee: Western Electric Company, Inc., New York, N.Y.

[21] Appl. No.: 292,327

[22] Filed: Aug. 12, 1981

[51] Int. Cl.³ .......................................... H04Q 11/04
[52] U.S. Cl. ............................... 370/62; 179/18 AD; 179/18 B
[58] Field of Search .......... 370/62; 179/18 AD, 18 B, 179/18 BC, 18 BD, 175.2 C, 27 F, 27 FE

[56] References Cited

U.S. PATENT DOCUMENTS

| | | | |
|---|---|---|---|
| 3,301,962 | 1/1967 | McKelvey et al. | 179/18 BC |
| 3,976,841 | 8/1976 | Picandet | 179/27 FE |
| 4,257,120 | 3/1981 | Funderburk et al. | 179/18 BC |
| 4,309,572 | 1/1982 | Mori et al. | 370/62 |

OTHER PUBLICATIONS

"Tuning in on the Space Shuttle," Jul.-Aug. 1981, We magazine.
Sales Brochure for Hitachi AX2X PABX.

Primary Examiner—Douglas W. Olms
Attorney, Agent, or Firm—H. St. Julian; J. J. Jordan

[57] ABSTRACT

A second-incoming call appears at an attendant facility (34) within a PBX system (20) while the attendant is awaiting a response on a first-incoming call. The attendant activates an overlap button (35) to facilitate the conversion of the first-incoming call into a listen-only connection. The attendant then establishes a two-way connection between the attendant and the second-incoming call to be served by the PBX system (20). Thereafter, the attendant monitors the first-incoming call on a listen-only basis while simultaneously serving the second-incoming call associated with the two-way connection.

15 Claims, 14 Drawing Figures

METHODS OF AND SYSTEMS FOR MONITORING A FIRST CALL CONNECTION WHILE EFFECTING THE ESTABLISHMENT OF A SECOND CALL CONNECTION

TECHNICAL FIELD

This invention relates to methods of and system for monitoring a first call connection while effecting the establishment of a second call connection and particularly to methods of and systems for coupling a first call connection to a listen-only port while a second call connection is coupled to a listen-talk port.

BACKGROUND OF THE INVENTION

In Private Branch Exchange (PBX) systems, an attendant processes incoming calls separately and independently of one another. Frequently, an attendant may be awaiting a response on a first-incoming call at an attendant facility when a second-incoming call appears at the facility. When the condition occurs, the attendant may (1) place the first call in a hold mode and then process the second call or (2) ignore the second-incoming call until the first-incoming call has been completed. If the attendant chooses the first alternative, the first-incoming call may be lost unless the party on the call is informed of being placed into the hold mode. If the attendant chooses the second alternative, the second-incoming call may be lost.

In one known system, key telephones were modified to enable the attendant to monitor a plurality of lines simultaneously without the capability of conversing. The system also included two-way circuits for conversation. Therefore, the attendant could monitor only a plurality of lines while conversing on a separate two-way circuit. This system requires a separate line for each call that is being monitored as well as a separate line for the two-way circuit. Moreover, this system does not allow conversation between a party whose call is being monitored and the attendant.

Consequently, to prevent the occurrence of either of the dilemas mentioned above without requiring separate lines, there is a need for methods of and systems for allowing an attendant to (1) process the second-incoming call while monitoring the progress of the first-incoming call and (2) return to the first-incoming call when necessary.

SUMMARY OF THE INVENTION

The invention contemplates methods of and systems for monitoring a first call connection in a switching system while effecting the establishment of a second call connection with an attendant facility. A first two-way transmission connection is established between the attendant facility and a first call to be served by the system. The first two-way transmission connection is covered to a one-way listen-only connection by the attendant facility. A second two-way transmission connection is established between the attendant facility and a second call to be served by the system. Thereafter, the first transmission connection is monitored on a listen-only basis while simultaneously serving the second call associated with the second two-way transmission connection.

DETAILED DESCRIPTION

Figure 1:
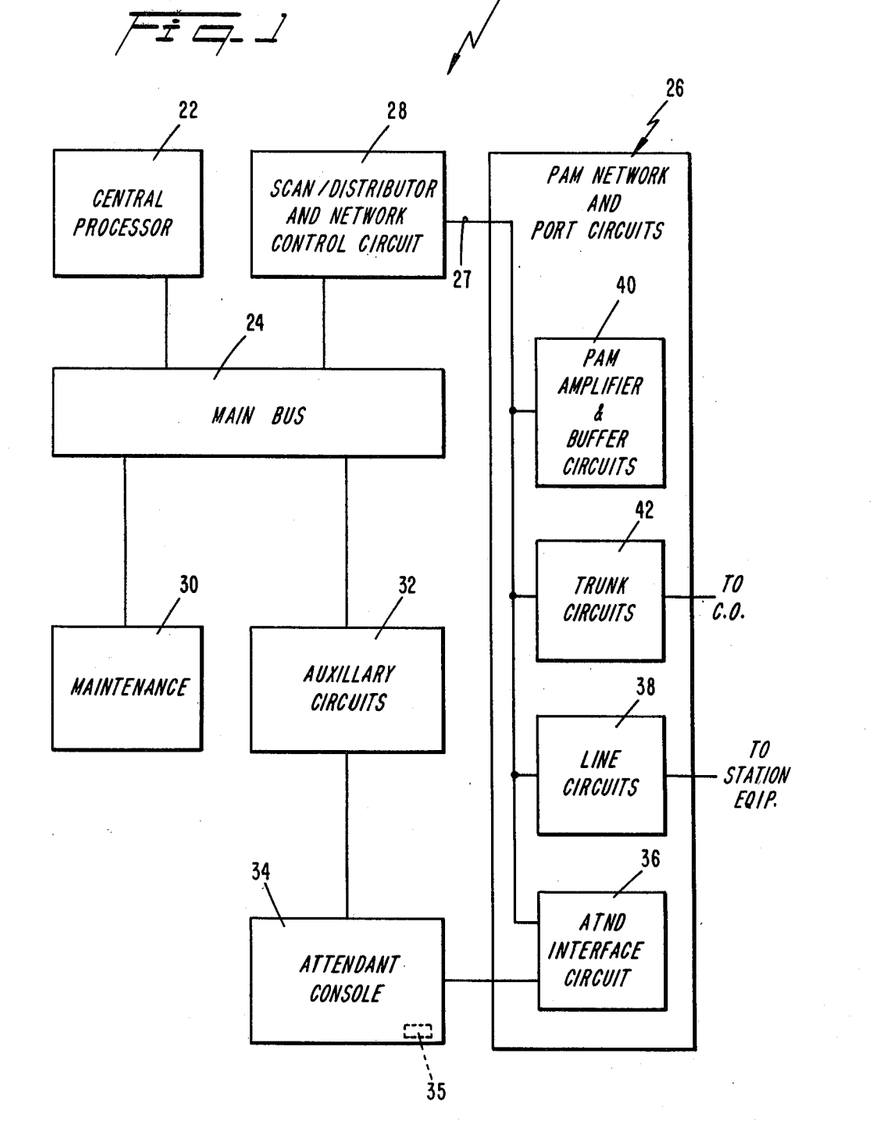
FIG. 1 is a block diagram of a private branch exchange system in accordance with certain principles of the invention.

Referring to FIG. 1, there is illustrated a block diagram of a PBX system, designated generally by the numeral 20. The system 20 includes a central processor 22, a main bus 24 and pulse amplitude modulation (PAM) network and port circuits, designated generally by the numeral 26. System 20 further includes a PAM bus 27, scanner/distributor and network control circuits 28, maintenance circuits 30, auxiliary circuits 32 and an attendant facility, such as an attendant console 34.

The central processor 22 facilitates control of the system 20 by executing instructions which are a part of an executive control program stored in a random access memory circuit (not shown). The central processor 22 also facilitates control of call processing by (1) periodically interrogating the status of the network and port circuits 26, (2) interpreting a change of status detected within the network and port circuits and (3) issuing commands to the network and port circuits to advance a call to its next logical state. The central processor 22 communicates with the remaining parts of the system 20 through the main bus 24.

The network and port circuits 26 includes an attendant interface port circuit, designated generally by the numeral 36, line port circuit 38, PAM amplifier and buffer circuits 40 and trunk port circuits 42. The network and port circuits 26 facilitate the connection of the system 20 to the trunk circuits 42, provide on-hook/off-hook status to the scanner/distributor and network control circuits 28 and receives commands from the central processor 22 which facilitate a change of state for a particular one of the port circuits 36, 38 or 42.

The scanner/distributor and network control circuits 28 (1) senses the status of the network and port circuits 26 to determine the state of a switchhook (not shown) for line port circuits 38 and any of several states for trunk port circuits 42, (2) contain a system clock (not shown), (3) assign time slots to the port circuits 36, 38 and 42 and (4) synchronize existing network connections.

The maintenance circuit 30 facilitates modification of the configuration of the system 20 and provides alarm and fault indications for hardware and software faults.

The auxiliary circuits 32 provide a data channel (not shown) for the attendant console 34 and measure the level of traffic which goes into the attendant console.

The executive control program facilitates the monitoring of the behavior of the system 20 and generates a regular and periodic task matrix. A task dispenser program, which receives control from the executive control program, schedules the execution of tasks according to the task matrix generated by the executive control program. Tasks are programs designed to search for a change of state within the system 20. The task dispenser program releases control to a specific-oriented program which thereafter returns control to the task dispenser after the assigned task has been completed.

The system 20 utilizes time division switching to facilitate interconnections between port circuits which include the attendant interface port circuit 36, the line port circuits 38 and the trunk port circuits 42. The PAM bus 27 is time-shared when port circuits 36, 38 and 42 are interconnected during a conversation cover the bus for short, periodic intervals called time slots. All of the port circuits 36, 38 and 42 which are assigned to the same time slot, are automatically connected in the same conversation.

Each of the port circuits 36, 38 and 42 contains a recirculating shift register (not shown) which serves as a time slot memory. The shift register, when active in a time slot, is continuously closed and enables an appropriate time division sampling switch (not shown). The enablement of the appropriate time division sampling switch facilitates connections to the system 20.

Figure 2:
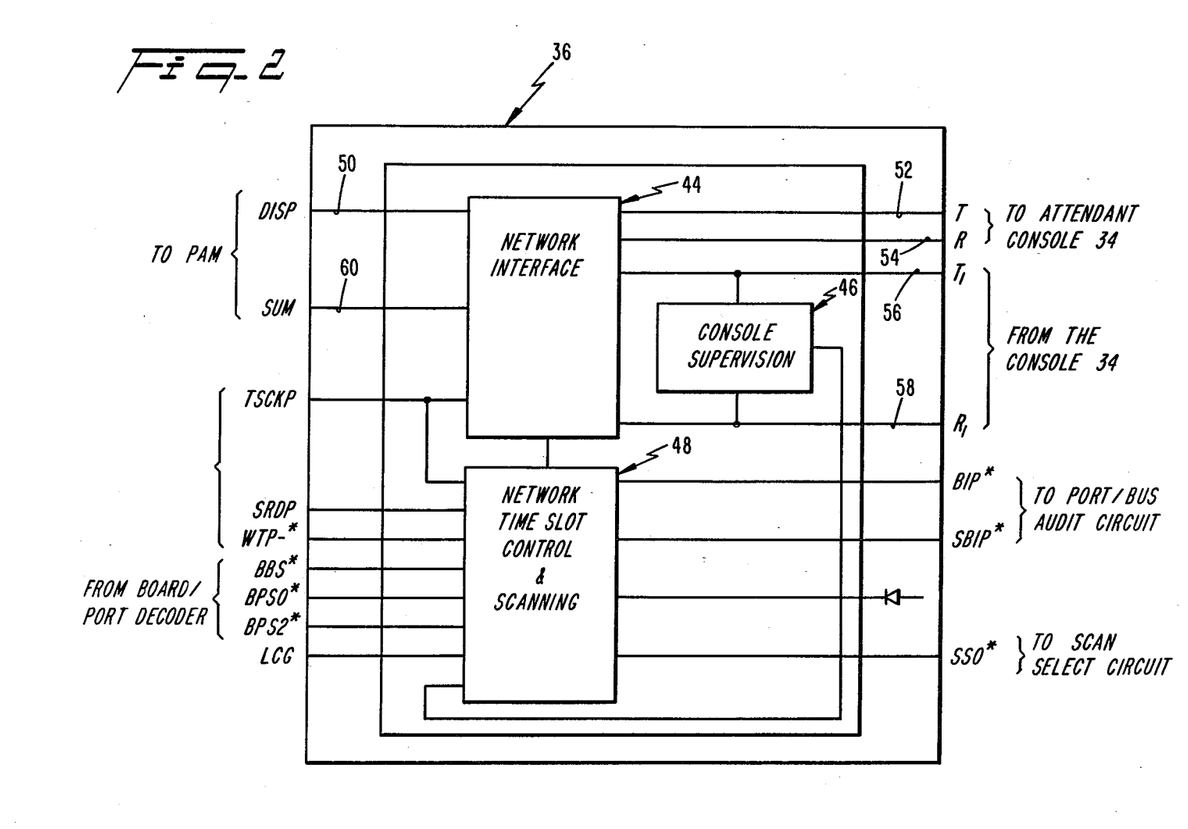
FIG. 2 is a block diagram of an attendant interface circuit in accordance with certain principles of the invention.

Referring to FIG. 2, there is illustrated a block diagram of the attendant interface port circuit 36. The port circuit 36 facilitates an overlap connection to two calls with the attendant console 34 (FIG. 1). The port circuit 36 includes a network interface circuit, designated generally by the numeral 44, a console supervision circuit, designated generally by the numeral 46, and a network time slot control and scanning circuit, designated generally by the numeral 48. The network interface circuit 44 facilitates transmission between the attendant console 34 and the port circuits 38 and 42. The network time slot control and scanning circuit 48 facilitates an assignment of a first time-slot and a second time-slot to enable the overlap connection of two calls with the attendant console 34. The console supervision circuit 46 detects loop current when a console handset or headset (not shown) is coupled to the attendant console 34.

Figure 4:
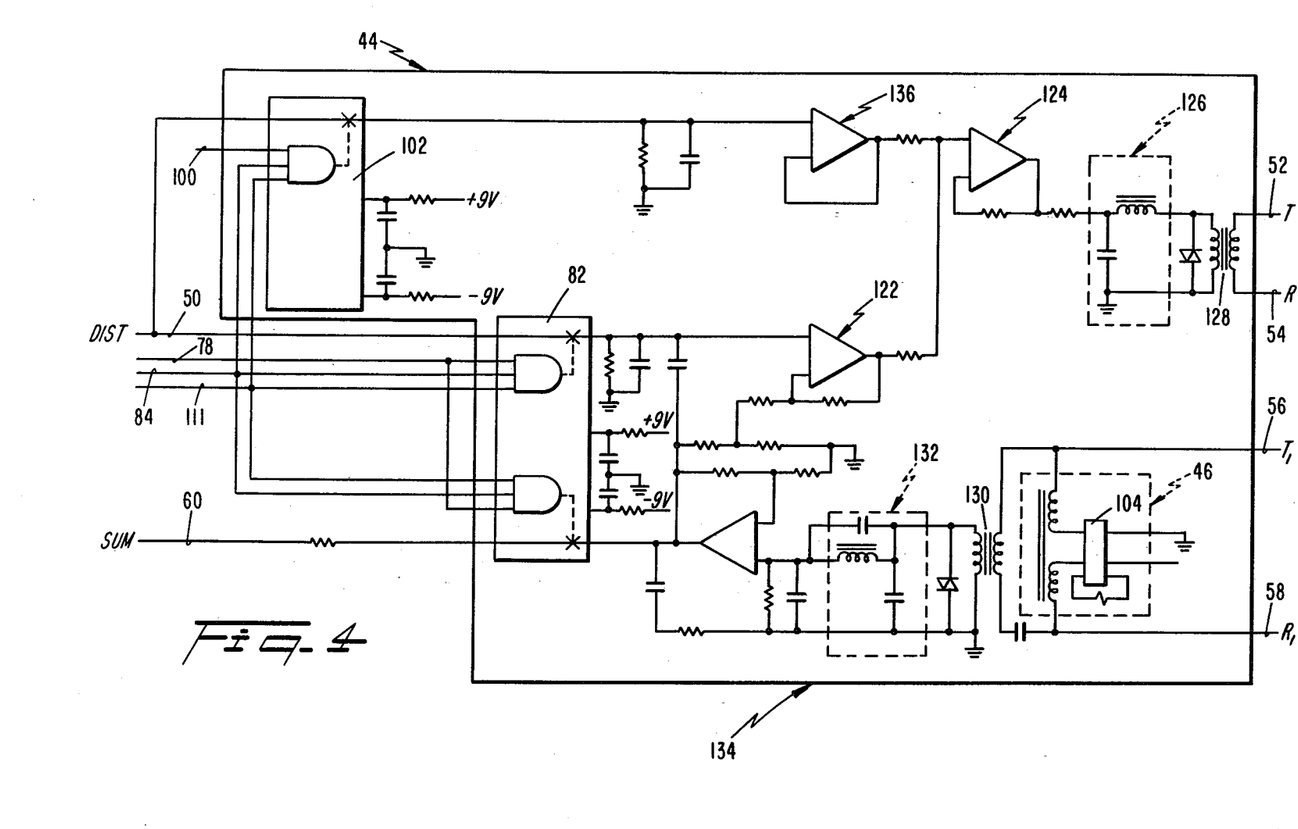

In operation, a single two-way transmission connection between the port circuits 38 or 42 and the attendant console 34 (FIG. 1) is established by writing a time-slot within the network time-slot control and scanning circuit 48 (FIG. 1). Thereafter, transmission or PAM signals, which are fed from PAM amplifier and buffer circuits 40, appearing on a distribution (DIST) bus 50 (FIGS. 2 and 4) are amplified and filtered by the network interface circuit 44 (FIGS. 2 and 4). The filtered PAM signals are then fed to the attendant console 34 over lines 52 and 54. Analog signals from the attendant console 34, which enter the attendant interface port circuit 36 on lines 56 and 58, are filtered and amplified by the network interface circuit 44. The filtered analog signals are then fed to the trunk port circuits 42 on a SUM bus 60. After the single two-way connection has been established and a second call appears at the attendant console 34 or the attendant desires to initiate a second call, the attendant operates an overlap key 35 (FIG. 1), which is located on the attendant console. The operation of the overlap key 35 is detected by the scanner/distributor and network control circuits 28 through bus 27. The scanner/distributor and network control circuit 28 then generates a stimulus which enables the processor 22 to transfer the current time-slot assignment within the network time-slot control and scanning circuit 48.

PAM signals from the first connection appears on the DIST bus 50 (FIGS. 2 and 4) continues to be processed by the network interface circuit 44 (FIG. 3) and transmitted to the attendant console 34 (FIG. 1) over lines 52 and 54. However, the system 20 (FIG. 1), due to the transfer of the time-slot assignment within the network time-slot and scanning circuit 48 (FIG. 1), does not provide for a second connection of the attendant console 34 (FIG. 1) to the SUM bus 60. Therefore, no analog signals are transmitted from the attendant console 34 to the network and the two-way transmission connection is changed to an attendant listen-only connection thus establishing the overlap connection. Once the overlap connection has been established, the attendant may establish a two-way transmission connection with the attendant console 34 by using the network time-slot control and scanning circuit 48 as described above.

Figure 3:
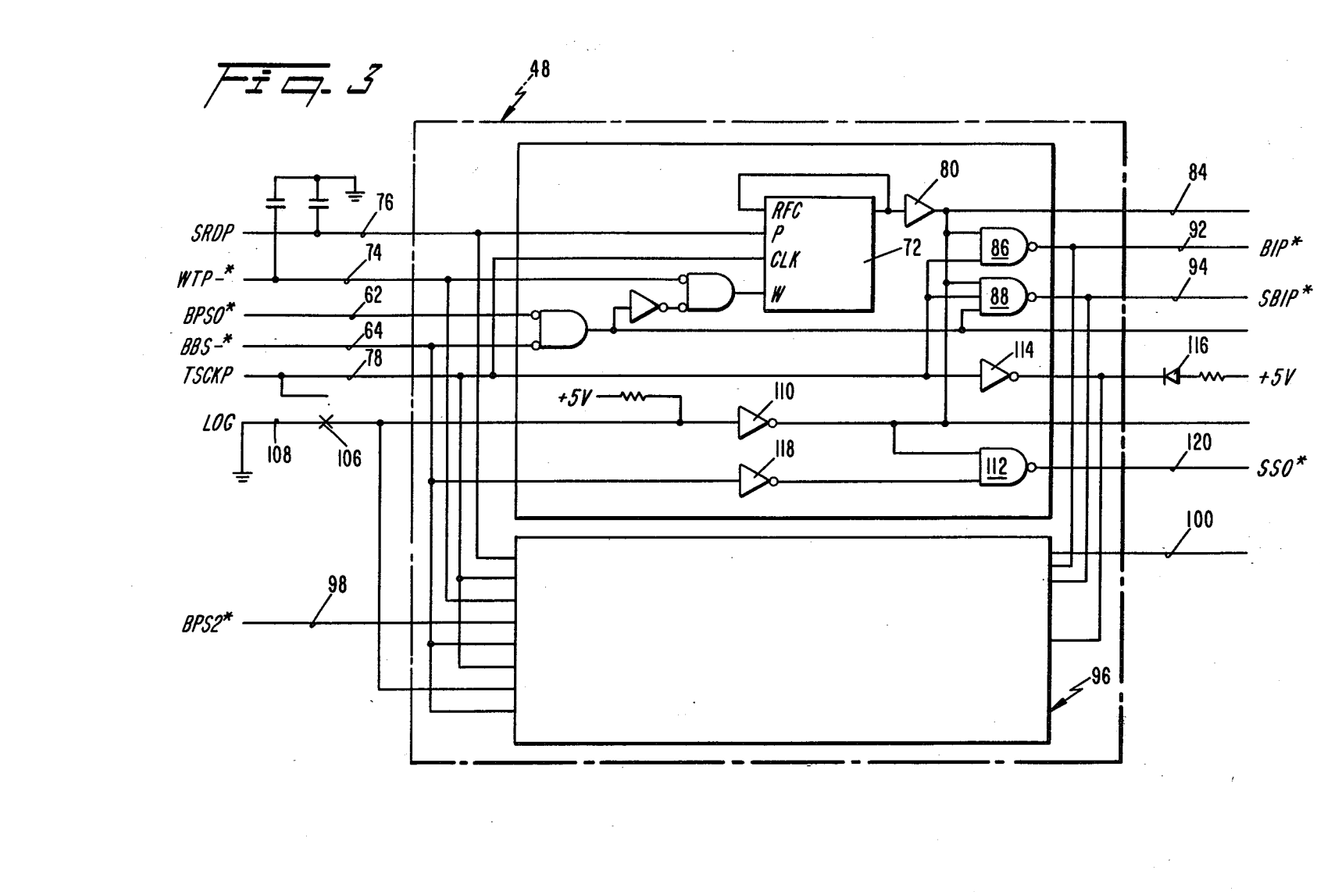
FIGS. 3 and 4 are schematic diagrams of the attendant interface circuit of FIG. 2.

Referring to FIG. 3, there is illustrated a detailed description of the network time-slot control and scanning circuit 48. As mentioned above, transmission connections are established within the system 20 (FIG. 1) by writing a time-slot within the network time-slot control and scanning circuit 48. In order to establish a transmission connection with the port circuit 36 (FIGS. 1 and 2), the central processor 22 (FIG. 1) selects the circuit by activating port select (BPSO*) and board select (BBS*) address lines 62 and 64, respectively. The address lines 62 and 64 are inputs to a NOR gate 66. The output of the NOR gate 66 is fed through inverter 68 to one input of a NOR gate 70. A write enable signal, which facilitates the loading of a recirculating port shift register 72, is fed to a second input of NOR gate 70 over line 74. A time-slot data bit and a clock signal are fed to the shift register 72 over lines 76 and 78, respectively. After the central processor 22 had addressed the port circuit 36, the presence of the time-slot data bit, the write enable and the clock signals facilitate the insertion of a single bit into the shift register 72. When the bit recirculating in shift register 72 appears at the output of the shift register, it is fed through buffer 80 to an input of an analog switch 82 (FIG. 4) over line 84.

The output of shift register 72 is also fed to NAND gates 86 and 88 over line 90. The clock signal, appearing on line 78, is fed to an input of NAND gate 86 which drives a busy/idle (BIP*) bus 92. The BIP* bus 92 commonly serves port circuits 36, 38 and 42. The BIP* bus 92 will exhibit a low signal condition during an interval when any one of the port circuits 36, 38 and 42 connected thereto is assigned an active time slot.

The clock signal, which appears on line 78, is also fed to an input of NAND gate 88 along with the output of NOR gate 66. NAND gate 88 drives a select busy/idle (SBIP*) bus 94. The SBIP* bus 94 is similar to the BIP* bus 92 except that the SBIP* bus exhibits a low signal state during a time slot only if the address one of the port circuits 36, 38 and 42 has an assigned time slot.

The network time slot control and scanning circuit 48 contains a second recirculating port circuit shift register, designated generally by the numeral 96. The central processor 22 (FIG. 1) selects shift register 96 by activating the BBS* line 64 and a port select (BPS2*) line 98. The circuits associated with shift register 96 performs the same way as the associated circuits described above for shift register 72. The output of shift register 96 appears on line 100 and is fed to analog switch 102 (FIG. 4).

Referring to FIG. 4, there is illustrated a detailed description of the network interface circuit 44 and the console supervision circuit 46. The console supervision circuit 46 includes a line relay 104 which monitors the continuity of loop current between lines 56 and 58. The line relay 104 is operated when the console handset or headset (not shown) is coupled to the console 34 (FIG. 4). Referring to FIG. 3, relay contact 106 is operated by line relay 104 to selectively ground line 108 (LCG). When relay contact 106 is operated, a ground signal appears at the input of an inverter 110. The output of the inverter 110, which appears on line 111, is fed to an input of a NAND gate 112 and is further fed through inverter 114 to a light emitting diode 116, which indicates when the port circuit 36 (FIGS. 1 and 2) is busy. The BBS* line 64 is also coupled to an input of NAND gate 112 through inverter 118. The output of NAND gate 112, which appears on line 120, indicates whether the console 34 is attended or unattended.

Referring again to FIG. 4, analog switch 82, which couples the DIST bus 50 to the attendant interface circuit 36 (FIGS. 1 and 2), is enabled by (1) the clock signal appearing on line 78, (2) the output signal from shift register 72 appearing on line 84, and (3) the loop current signal appearing on line 111. Once the analog switch 82 has been enabled, PAM signals appearing on DIST bus 50, which appear during a first time slot interval are fed through an amplifier, designated generally by the numeral 122, to a summing amplifier, designated generally by the numeral 124. Output signals from the summing amplifier 124 are fed through (1) a filter circuit designated generally by the numeral 126 and (2) an impedance transformer 128 to lines 52 and 54. Lines 52 and 54 are coupled to the console 34 (FIG. 1). As noted above, analog signals from the console 34 enter the port circuit 36 (FIG. 1) on lines 56 and 58. The analog signals are then fed through (1) impedance transformer 130, (2) a filter circuit, designated generally by the numeral 132, (3) an amplifier, designated generally by the numeral 134 and (4) the analog switch 82 to the SUM bus 60. Thus, analog switch 82 facilitates the establishment of a two-way transmission connection.

Analog switch 102 is enabled by (1) the clock signal appearing on line 78, (2) the signal appearing on line 111 and (3) the output signal from shift register 96 (FIG. 3). Once analog switch 102 has been enabled, PAM signals on DIST bus 50, which appear during the second time-slot interval, are fed through (1) an amplifier, designated generally by the numeral 136, (2) the summing amplifier 124, (3) the filter 126 and (4) the impedance transformer 128 to lines 52 and 54. Analog switch 102 does not provide for a connection to SUM bus 60. Thus, analog switch 102 facilitates the establishment of a one-way or listen-only transmission connection with the console 34 (FIG. 1).

In use, when the attendant initiates a call or when a call appears on a switch loop on the attendant console 34 (FIG. 1), the processor 22 under control of the executive program. detects a change of state within the system 20. The processor 22 then facilitates the generation of an available time-slot. The scanner/distributor and network control circuit 28 establishes a two-way connection by writing the time-slot into the port-shift register 72 (FIG. 3). The writing of the time-slot into shift register 72 causes line 84 to go to a high state during the time-slot interval. The output of shift register 72 then enables analog switch 82. PAM signals which are present on the DIST bus 50 are fed through amplifier 122, summing amplifier 124, filter circuit 126 and impedance transformer 128 to the console 34 over lines 52 and 54. As noted above, analog signals from the console 34 are fed over lines 56 and 58 through impedance transformer 130, filter circuit 132, amplifier 134 and analog switch 82 to the SUM bus 60.

After the two-way transmission connection has been established, if the attendant desires to monitor this connection while handling calls appearing on a different switch loop, the attendant activates the overlap button 35 (FIG. 1). Upon detecting the activation of the overlap button, the processor 22 (FIG. 1), under control of an overlap program, proceeds to activate the overlap connection by transferring the time-slot assigned to shift register 72 (FIG. 3) to shift register 96 (FIG. 3). To accomplish the transferring of the time-slot, the processor 22 accesses a translation table stored in memory which consists of two internal line numbers for the console 34 (FIG. 1) port shift registers 72 and 96. The table value of the first port shift register 72 is used to remove the attendant from the port circuit 36 (FIGS. 1 and 2). The table value of the second port shift register 96 is used to add the attendant back to the port circuit 36 but onto shift register 96. As noted above, the assignment of a time-slot to shift register 96 facilitates the establishment of the listen-only transmission connection. Therefore, analog 102 will be enabled when the bit circulating within port shift register 96 appears on line 100. Thereafter, PAM signals, appearing on DIST bus 50, are transmitted to the console 34 as noted above and the attendant can establish a two-way connection utilizing shift register 72.

When the attendant desires to speak with the party on the listen-only connection, the overlap button 35 (FIG. 1) is activated a second time. The procedure, as noted above, is reversed. The translation table is accessed to remove the attendant from the port circuit 36 (FIGS. 1 and 2). However, the attendant is then added back to the port circuit 36 using the internal line number for port shift register 72 (FIG. 3). The party on the two-way connection is placed in a hold mode while the initial call is being processed.

Referring to FIGS. 5 through 12, the flow charts illustrated therein reveal the steps of the overlap program, which enables the processor 22 (FIG. 1) to establish the overlap connection. In order to establish the overlap connection, a two-way transmission connection must be established as described above. Thereafter, the attendant must activate the overlap button 35 (FIG. 1). Step 200 stores a console number for the attendant in register 7. Step 201 stores the number which represent the particular switch loop on which the two-way connection was established. Step 202 determines whether the overlap connection is presently active. If the overlap connection is not active, step 203 determines whether a progress mark indicates that the transmission connection or call was initiated by a party other than the attendant, hereinafter referred to as a calling party. The progress mark of a call is a field dedicated in memory and refers to the current state of the call. Blocks of memory associated with the call are referred to as trunk tables or trunk records. The call state is recorded in the trunk tables as a progress mark which is changed to record a change in a call's state. Step 204 determines whether the progress mark indicates the call was initiated by the attendant to a party, hereinafter referred to as a called party. If the party on the two-way connection was either a calling party or a called party, steps 203 and 204 transfer control to a subprogram which facilitates the activation of the overlap connection.

Figure 5:
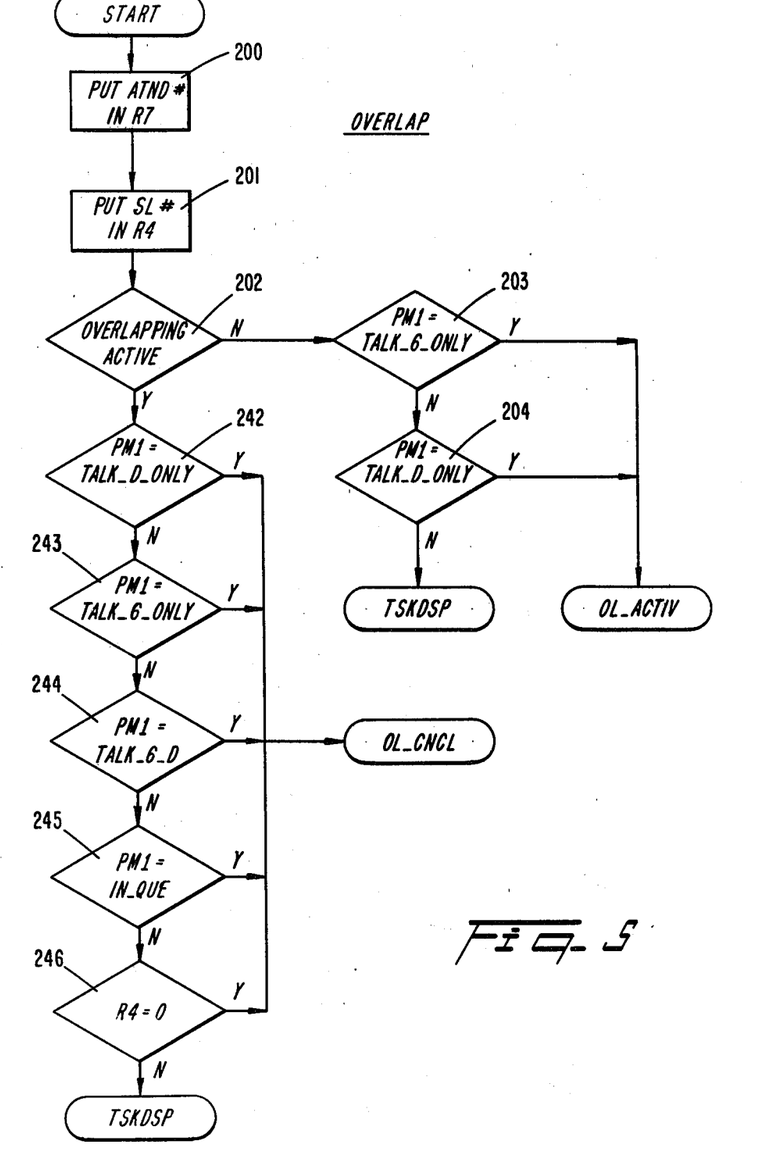
FIGS. 5 through 14 show various flow diagrams which illustrate the programmed procedure of control and operation of the system of FIG. 1 in accordance with certain principles of the invention.
Figure 6:
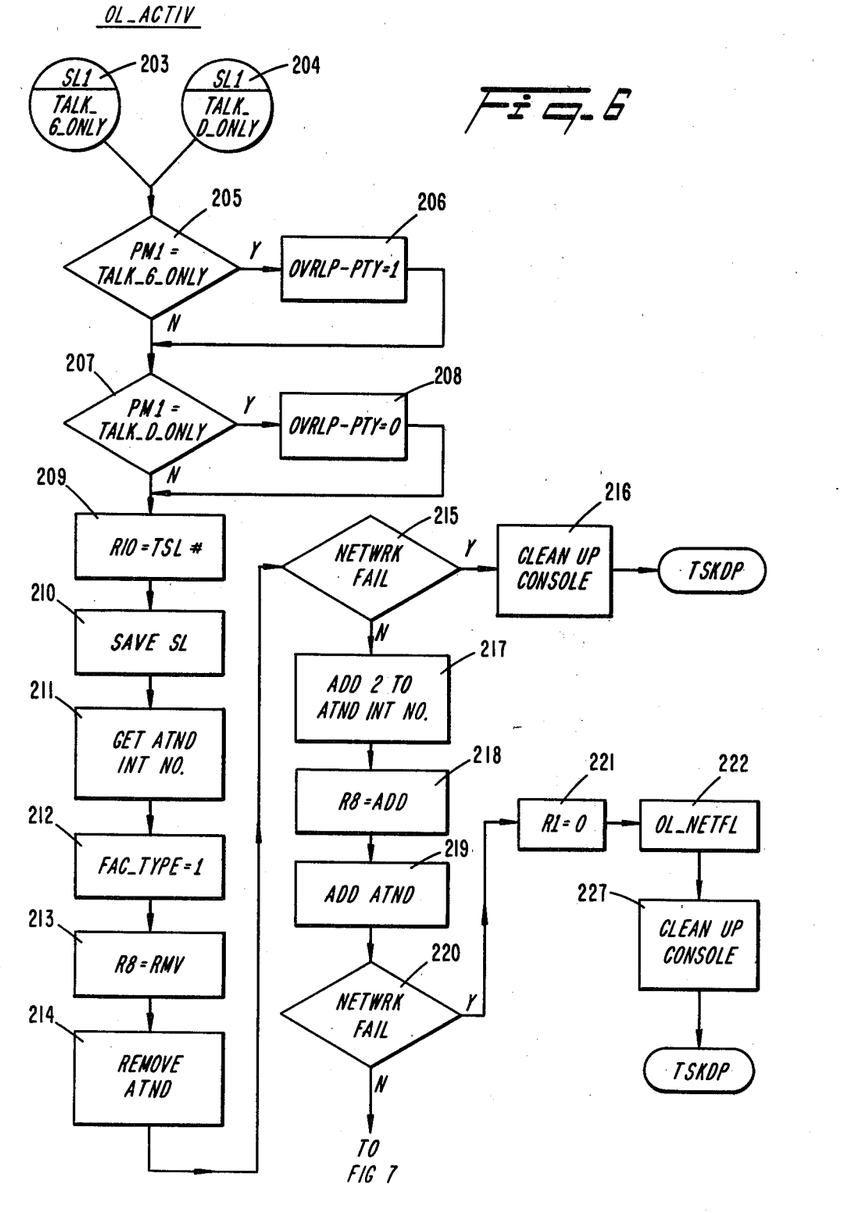
Figure 7:
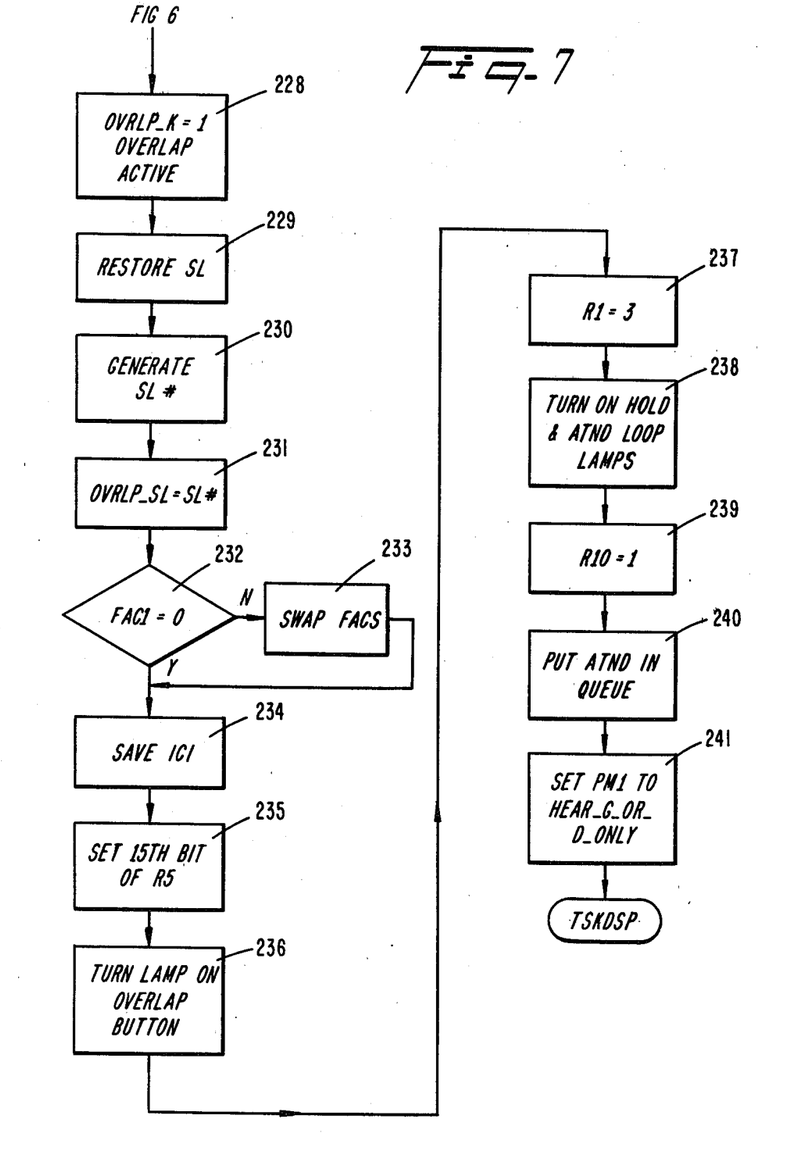

Referring to FIGS. 6 and 7, the flow chart illustrated therein reveals the steps of an OL-ACTIV subprogram which activates the overlap connection. Step 205 checks the progress mark to determine the state of the call. Step 206 sets OVRLP-PTY equal to a value of one if the party on the two-way connection was a calling party. Steps 207 and 208 determines the status of the progress mark and sets OVLP-PTY equal to a value of zero if the party on the two-way connection was a called party. Step 209 stores the time-slot assigned to shift register 72 (FIG. 3) in register 10. Step 210 stores the internal number of the switch loop on which the two-way connection exists. Step 211 accesses the attendant internal line number for port shift register 72 (FIG. 5). Step 212 sets FAC-TYPE equal to a value of one which indicates that the attendant is viewed as a line circuit. Step 213 stores a removal code in register 8. Step 214, based on the removal code stored in register 8, removes the time-slot stored in shift register 72 (FIG. 3) which removes the attendant from port circuit 36 (FIGS. 1 and 2). Step 215 determines whether the attendant was successfully removed from port circuit 36. Step 216 restores the console 34 (FIG. 1) and returns control to the task dispenser program if the system 20 (FIG. 1) failed to remove the attendant from port circuit 36. If the attendant was successfully removed from port circuit 36, step 217 adds two to the attendants internal line number. Step 218 stores an add code in register 8. Step 219, based on the add code stored in register 8, adds the time-slot that was removed from shift register 72 (FIG. 3) to shift register 96 (FIG. 3). This operation adds the attendant to port circuit 36 and facilitates the establishment of the listen-only connection. Step 220 determines whether the attendant was successfully added to port circuit 36. If the system 20 (FIG. 1) failed to add the attendant to port circuit 36, step 221, sets register 1 equal to zero. Step 222 calls a subroutine which adds the attendant back to port circuit 36 using shift register 72 (FIG. 3).

Figures 8, 11:
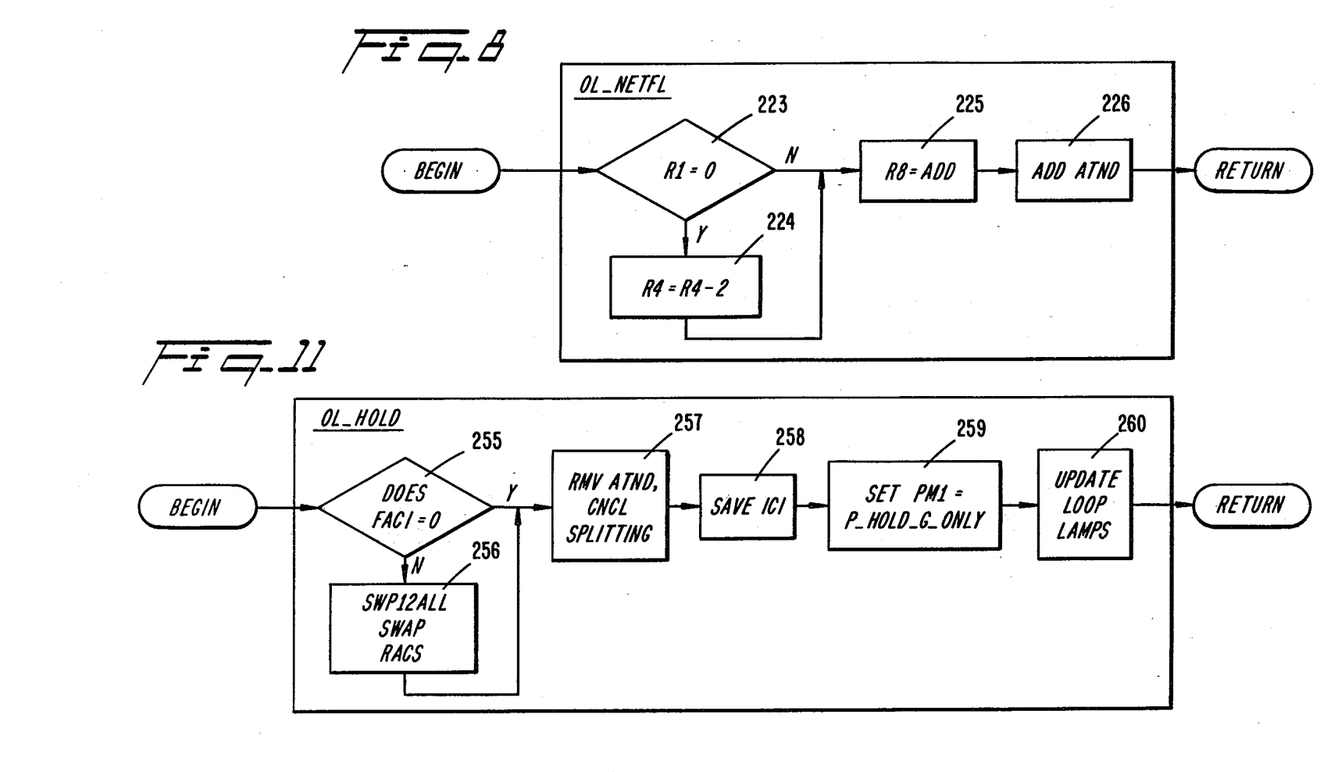

Referring to FIG. 8, the flow chart illustrated therein reveals the steps of a OL-NETFL subroutine which restores the previous condition of the attendant if the system 20 (FIG. 1) fails to remove the attendant from port circuit 36 (FIGS. 1 and 2). Step 223 determines whether the value stored in register 1 is zero. If the value is determined to be zero, step 224 reduces the attendant internal line number by a value of two. Step 225 stored an add code in register 8. Step 226 facilitates the addition of the attendant back to port circuit 36. Thereafter, control is transferred to step 227 of FIG. 6, which restores the console 34 (FIG. 1) and transfers control to the task dispenser program.

If the system successfully added the attendant to port circuit 36 (FIGS. 1 and 2) in step 220, step 228 (FIG. 7) sets the overlap active bit OVRLP-K equal to one. Step 229 restores the switch loop on which the two-way connection was active. Step 230 determines switch loop number on which the overlap connection is active. Step 231 stores the switch loop number generated in step 230. Step 232 determines whether a zero is stored in facility one (FAC1). If FAC1 is not equal to zero, step 233 exchanges the value stored in FAC1 with the value stored in facility two (FAC2). Step 234 stores in memory the message appearing on an incoming call indicator (not shown) which is a part of the console 34 (FIG. 1). Steps 235 and 236 set the fifteenth bit of register five and turns on a lamp (not shown) which is associated with the overlap button 35 (FIG. 1), respectively. Steps 237 sets register 1 equal to a value of three. Step 238 activates a hold and an attendant loop lamps (not shown) for the switch loop, which are located on the console 34. Steps 239 and 240 set register 10 equal to a value of one and puts the attendant in queue, respectively. The attendant is now available to handle additional calls utilizing a two-way connection. Step 241 moves the progress mark to indicate that the state of call is presently in a listen-only mode. Thereafter, control is returned to the task dispenser for further task assignments.

Referring again to FIG. 5, if the overlap connection was active in step 202, step 242 through 246 determine whether any of the following conditions are present: the progress mark indicates that (1) a called party is active on the connection, (2) a calling party is active on the connection and (3) a calling and a called party are active on the connection or whether the value stored in register 4 is zero, respectively. If any of the above conditions are present, control is transferred to a subprogram which facilitates the cancellation of the overlap connection. However, if none of the above conditions are present, step 246 transfers control to the task dispenser which facilitates normal call processing.

Figure 9:
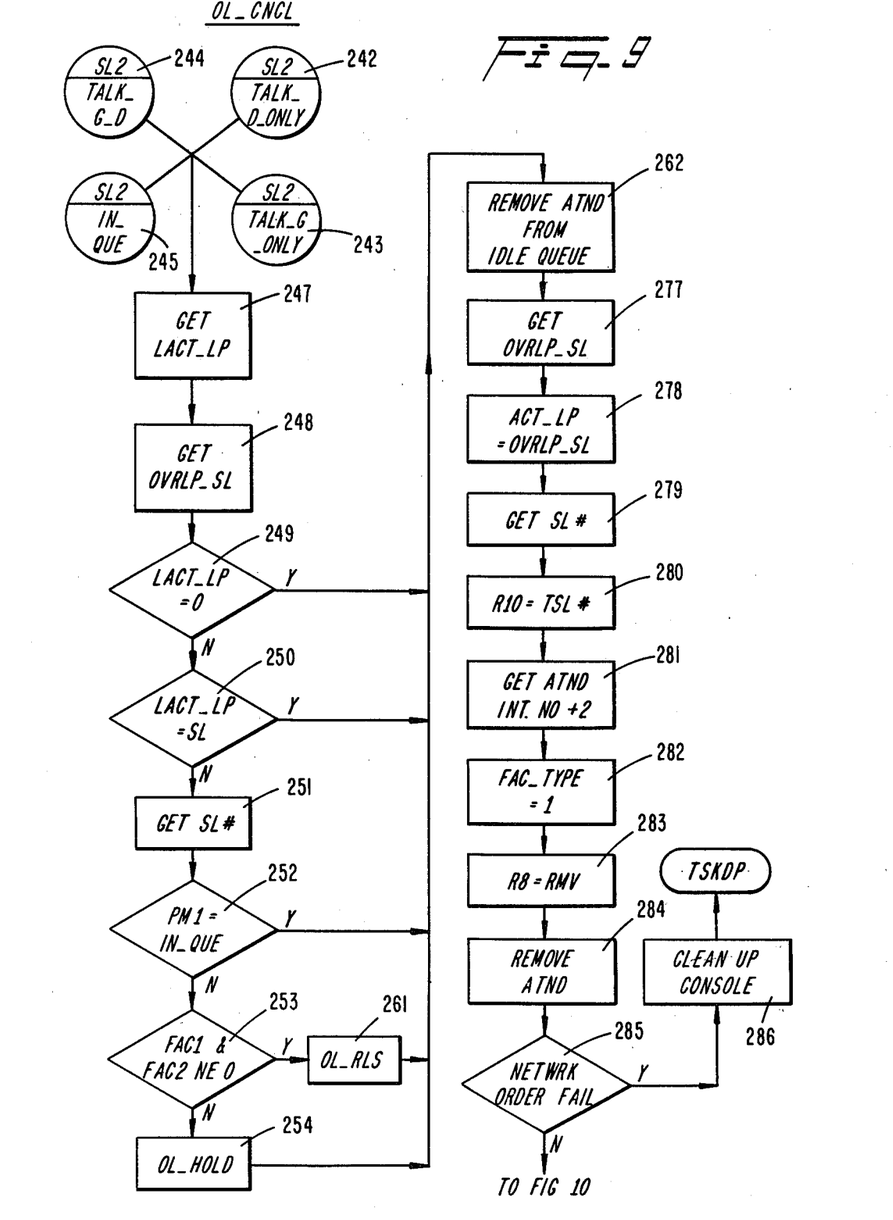
Figure 10:
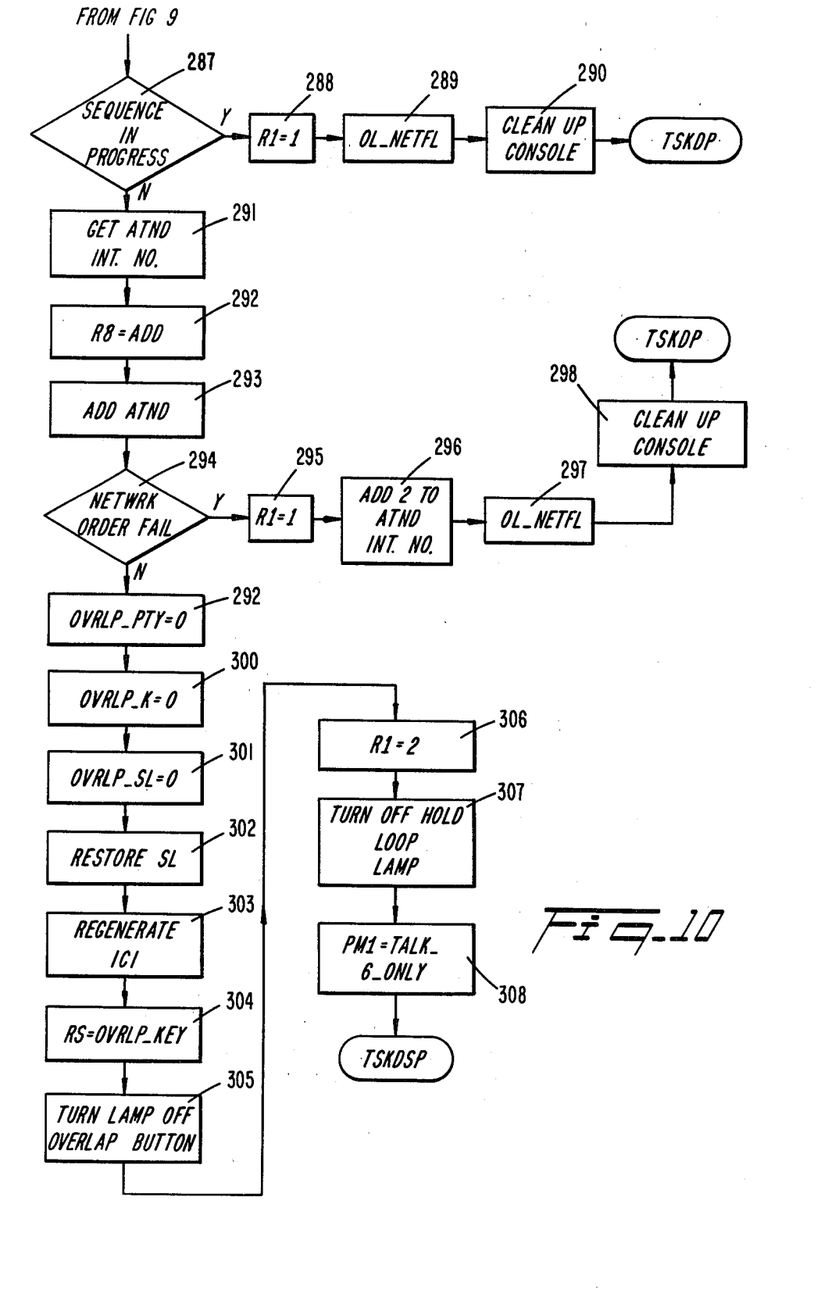

Referring to FIGS. 9 and 10, the flow chart illustrated therein reveals the steps of a OL-CNCL subprogram which facilitates the cancellation of the overlap connection. Step 247 retrieves from memory the switch loop on which the attendant was active. Step 248 retrieves from memory the switch loop on which the overlap connection is active. Step 249 determines whether the value stored in LACT-LP is zero. If the value stored is not zero, the attendant may be active on another call. Step 250 compares the last active switch loop with the overlap switch loop. If these two switch loops are the same, the last active loop is the overlap loop. Step 251 retrieves an internal record number for the overlap switch loop. Step 252 determines whether the attendant is in queue. If the attendant is not in queue, step 253 determines whether the attendant is active with one or two parties on the two-way connection. If the value stored in either FAC1 or FAC2 is the value zero, the attendant is active with only one party. Step 254 calls a subroutine which places the one party in a hold mode.

Referring to FIG. 11, the flow chart illustrated therein reveals the steps of a OL-HOLD subroutine which places one party in a hold mode. Step 255 determines whether value of zero is stored in FAC1. If a value other than zero is stored in FAC1, step 256 exchanges the value stored in FAC1 and FAC2. Otherwise, step 257 facilitates (1) the removal of the attendant from the two-way connection and (2) cancellation of splitting which enables the attendant to re-establish a connection with the party in the hold mode. Step 258 stores the message which presently appears on the incoming call indicator. Step 259 advances the progress mark to indicate that a calling party is in the hold mode. Step 260 updates the loop lamp for the specific switch loop located on the console 34 (FIG. 1) put on hold in step 259. Thereafter, control is returned to step 262 of FIG. 9.

Figure 12:
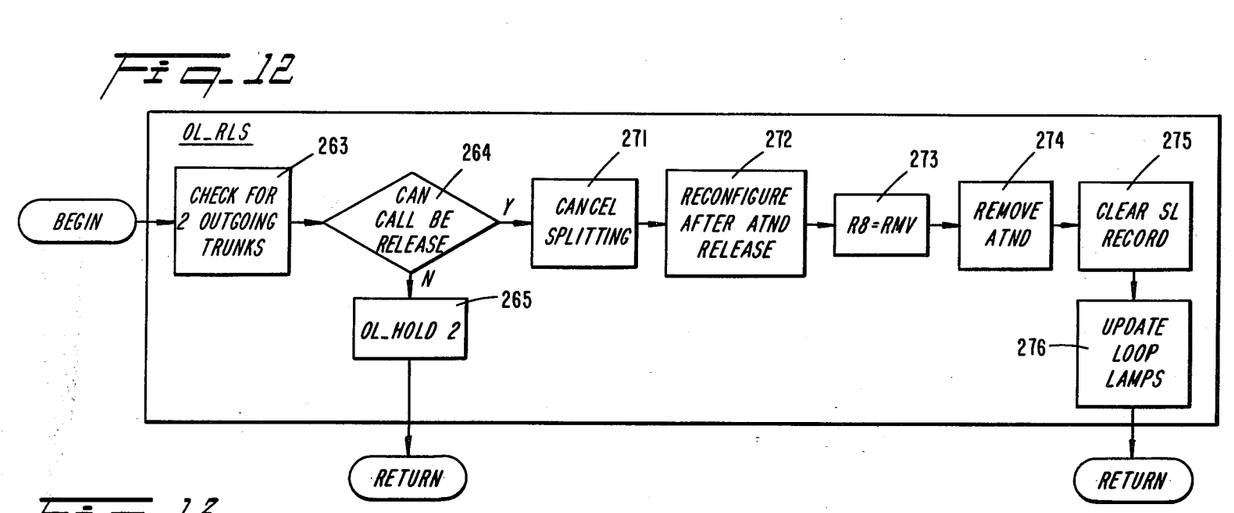

However, if it was determined in step 253 that the value stored in both FAC1 and FAC2 are not equal to the value of zero, the attendant is active with two parties. Step 261 calls a subroutine which will release both parties from the console 34 (FIG. 1). Referring to FIG. 12, the flow chart illustrated therein reveals the steps of a OL-RLS subroutine which will determine whether both parties should be released from the console 34 or placed in the hold mode. Step 263 verifies that there are two outgoing trunks on which the attendant is active. Step 264 determines whether both of the trunks have disconnect supervision. If both of the trunks do not have disconnect supervision, step 265 calls a subroutine which will place both of the parties in the hold mode.

Figure 13:
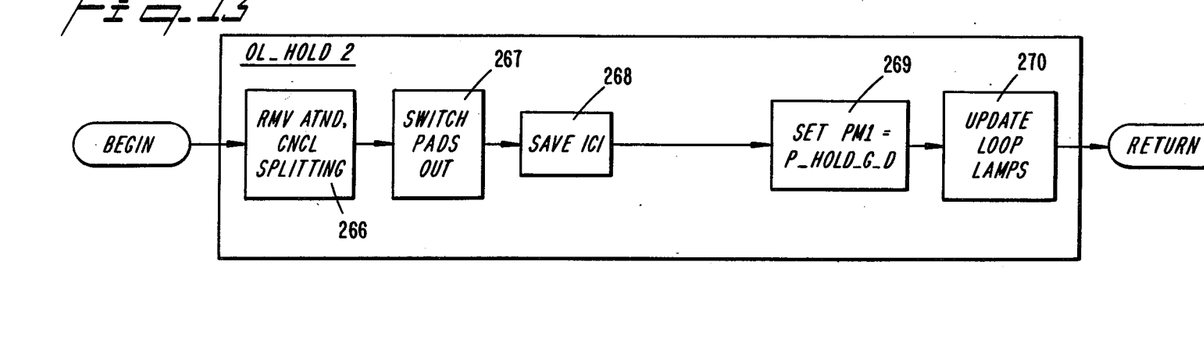

Referring to FIG. 13, the flow chart illustrated therein reveals the steps of a OL-HOLD2 subroutine which facilitates placing two parties in the hold mode. This hold mode enables both of the parties to communicate with each other and also enables the attendant to re-enter the connection. Step 266 removes the attendant from the connection and cancels splitting. Step 267 facilitates the addition of a plurality of db pads to reduce noise on the connection between the two parties in the hold mode. Step 268 stores the message which presently appears on the incoming call indicator. Step 269 advances the progress mark to indicate that a calling party and a called party are in the hold mode. Step 270 updates the switch loop lamps on the console 34 (FIG. 1). Thereafter, control is returned to step 262 of FIG. 9.

However, if it was determined that both of the trunks had disconnect supervision in step 264 (FIG. 12), step 271 cancels splitting. Step 272 establishes a connection between the two parties without utilizing the console 34 (FIG. 1) as a connection point. Step 273 stores the removal code in register eight. Step 274 based on the code stored in register eight, removes the attendant from the two-way connection. Step 275 clears the switch loop record stored in memory. Step 276 updates the loop lamps on the console 34. Thereafter, control is returned to step 262 of FIG. 9.

Referring again to FIG. 9, step 262 facilitates the removal of the attendant from the idle queue. Step 277 retrieves the value stored in OVRLP-SL from memory. Step 278 stores the value of OVRLP-SL in memory under the lable LACT-LP. Step 279 retrieves the internal number of the switch loop which was stored in step 213 (FIG. 6). Step 280 retrieves the time-slot number and stores it in register 10. Step 281 retrieves the attendant internal line number to which a value of two was added. Step 282 sets FAC-TYPE equal to a value of one. Step 283 stores a removal code in register 8. Step 284 facilitates the removal of the time-slot from shift register 96 which also removes the attendant from port circuit 36 (FIGS. 1 and 2). Step 285 determines whether the attendant was successfully removed from port circuit 36. Step 286 restores the console 34 (FIG. 1) and returns control to the task dispenser if the system 20 failed to remove the attendant from port circuit 36. Step 287 determines whether the overlap connection is in the process of disconnecting. Step 288 stores a value of one in register 1 if the trunk is disconnecting in step 287. Step 289 calls the OL-NETFL subroutine illustrated in FIG. 8. Steps 223 through 226 are executed as noted above. Step 290 restores the console 34 (FIG. 1) and transfers control to the task dispenser program.

However, if the trunk was not disconnecting from the port circuit 36 in step 287, step 291 retrieves the attendant internal line number from memory. Step 292 stores an add code in register 8. Step 293 adds the attendant back to port circuit 36 (FIGS. 1 and 2) by transferring the time-slot assigned to shift register 96 (FIG. 3) to shift register 72 (FIG. 3). Step 294 determines whether the attendant was successfully added to port circuit 36. Step 295 stores a value of one in register 1 if the attendant was not successfully added to port circuit 36. Step 296 adds two to the attendant internal number. Step 297 calls the OL-NETFL subroutine (FIG. 7) which facilitates adding the attendant back to port circuit 36 by re-writing the time-slot in shift register 96. Step 298 restores the console 34 (FIG. 1) and transfers control to the task dispenser program.

If the attendant was successfully added to port circuit 36 (FIGS. 1 and 2) in step 294, steps 299 through 301 clear all of the overlap information from memory. Step 302 restores the switch loop for normal call processing. Step 303 activates the incoming call indicator. Step 304 stores a code in register 5 which represents overlap button. Step 305 facilitates the deactivation of the lamp on the overlap button. Step 306 stores a value of two in register 1. Step 307 facilitates the deactivation of the hold loop lamp. Step 308 advances the progress mark to indicate that the state of the call is two-way connection involving a calling party. Thereafter, control is transferred to the task dispenser and normal call processing.

Figure 14:
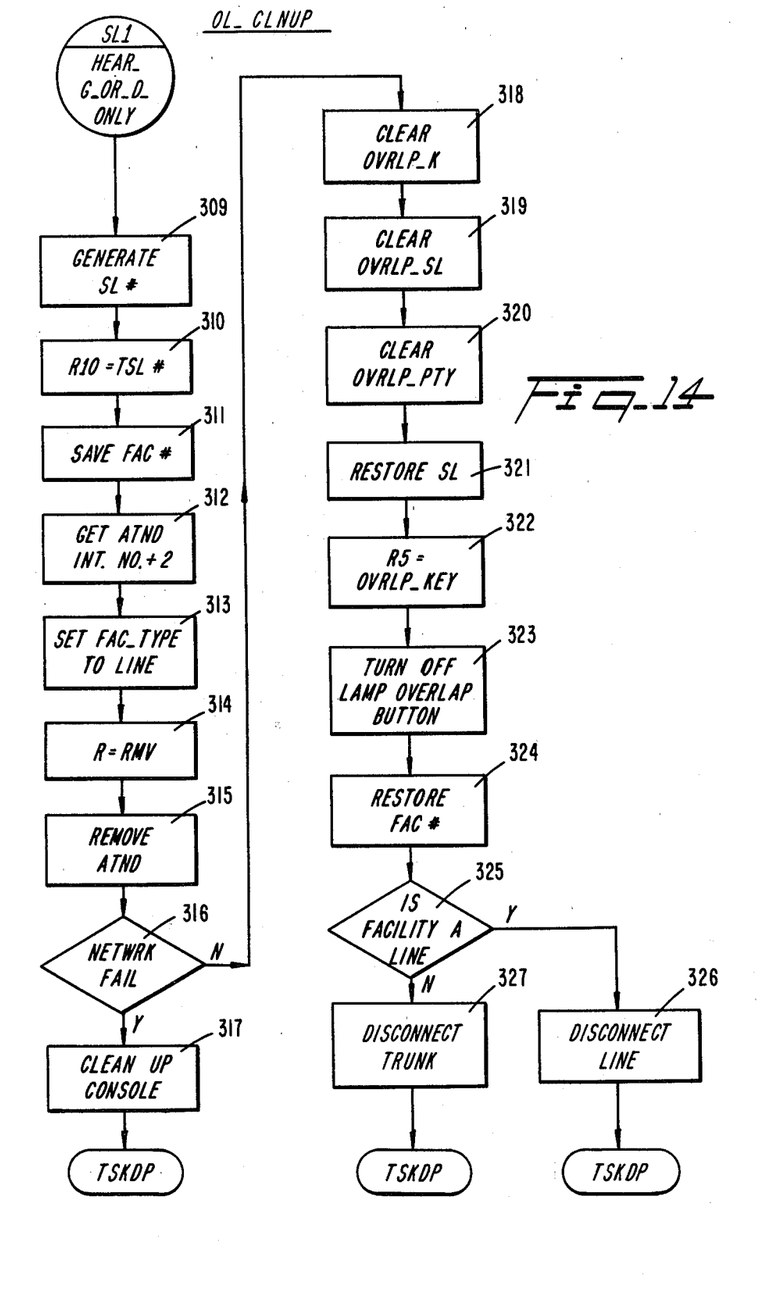

During the interval which the overlap connection is active, the processor 22 (FIG. 1) scans the status of all of the port circuits 36, 38 and 42 (FIG. 1). If the processor 22 detects that an overlap party has disconnected or has gone on-hook, an overlap cleanup (OL-CLNUP) subprogram is called. Referring to FIG. 14, the flow chart illustrated therein reveals the steps of the OL-CLNUP subprogram which enables the system 20 (FIG. 1) to facilitate normal call processing. Step 309 generates an internal number for the switch loop. Step 310 stores the time-slot number in register 10. Step 311 stores the number of the facility which disconnected in memory. Step 312 retrieves from memory the attendant internal line number to which a value of two was added. Step 313 set FAC-TYPE equal to a value of one. Step 314 stores a removal code in register 8. Step 315 facilitates the removal of the time-slot from shift register 96 (FIG. 3). Step 316 determines whether the time-slot was removed from shift register 96. Step 317 restores the console 34 (FIG. 1) and transfers control to the task dispenser program if the removal of the time-slot was not successful. Otherwise steps 318 through 320 clear all of the overlap information from memory. Step 321 restores the switch loop for normal processing. Step 322 stores a code representing the overlap button in register 5. Step 323 facilitates the deactivation of the lamp on the overlap button 35 (FIG. 1). Step 324 retrieves from memory the facility number which was stored in step 311. Step 325 determines whether the facility is a line or a trunk. If the facility is a line, step 326 facilitates a disconnect of the line from the system 20 (FIG. 1). Thereafter, control is transferred to the task dispenser program. If the facility is determined to be a trunk, step 327 facilitates a disconnect of the trunk from the system 20 (FIG. 1). Thereafter, control is transferred to the task dispenser program to facilitate normal call processing.

What is claimed is:

1. A method of monitoring at least a first call connection in a switching system while effecting the establishment of a second call connection, which comprises the steps of:

establishing a first two-way transmission connection between an attendant facility and a first call to be served by the system;

converting the first two-way transmission connection to a one-way listen-only connection by the attendant facility;

establishing a second two-way transmission connection between the attendant facility and a second call to be served by the system; and monitoring the listen-only connection while simultaneously effecting the establishment of the second call connection associated with the second two-way transmission connection.

2. The method as set forth in claim 1 wherein the step of establishing the first two-way transmission connection comprises the steps of:

generating a first time-slot in a series of cyclically reoccurring time-slots, representing a time-slot interval in which the first two-way transmission connection is served by the system; and assigning the first time-slot to an attendant interface circuit, which is coupled to the attendant facility, to effect the establishment of the first two-way transmission connection.

3. The method as set forth in claim 2 wherein the step of assigning the first time-slot comprises the step of storing the first time-slot in a first recirculating shift register which effects the establishment of the first two-way connection between the attendant facility and the first call.

4. The method as set forth in claim 3 wherein the step of converting the first two-way transmission connection comprises the step of transferring the first time-slot from the first recirculating shift register to a second recirculating shift register which effects the establishment of the one-way listen-only connection between the attendant facility and the first call.

5. The method as set forth in claim 4 wherein the step of establishing the second two-way transmission connection comprises the steps of:

generating a second time-slot in a series of cyclically reoccuring time-slots representing a time-slot interval in which the second two-way transmission connection is served by the system; and assigning the second time-slot to the attendant interface circuit to effect the establishment of the second two-way transmission connection between the attendant facility and the second call.

6. The method as set forth in claim 5 wherein the step of assigning the second time-slot comprises the step of storing the second time-slot in the first recirculating shift register.

7. The method as set forth in claim 2 which further comprises the step of selectively controlling, in response to the establishment of the first or the second two-way transmission connection, the flow of a first set of transmission signals from the first or second call, respectively, to the attendant facility and a second set of transmission signals generated by the attendant facility and is fed through the attendant interface circuit to the respective first or second call.

8. The method as set forth in claim 7 which further comprises the step of selectively controlling, in response to the establishment of the one-way listen-only connection, the flow of a third set of transmission signals to the attendant facility from the first call.

9. A switching system for monitoring at least a first call connection while effecting the establishment of a second call connection, which comprises:

an attendant facility;

means for establishing a first two-way transmission connection between a first call to be served by the system and the attendant facility;

means for converting the first two-way transmission connection to a one-way listen-only connection;

means for establishing a second two-way transmission connection between the attendant facility and a second call to be served by the system; and means for monitoring the listen-only connection by the attendant facility while simultaneously effecting the establishment of the second call connection associated with the second two-way transmission connection.

10. The system as set forth in claim 9 which further comprises:

an attendant interface circuit; and wherein the means for establishing the first two-way transmission connection comprises:

means fo generating a first time-slot; and means for assigning the first time-slot to the attendant interface circuit to facilitate the establishment of the first two-way transmission connection.

11. The system as set forth in claim 10 wherein the means for establishing the second two-way transmission connection comprises:

means for generating a second time-slot in a series of cyclically reoccurring time-slots; and means for assigning the second time-slot to the attendant interface circuit to effect the establishment of the second two-way transmission connection.

12. The system as set forth in claim 10 or 11 wherein the attendant interface circuit comprises:

means for storing a first time-slot;

means for storing a second time-slot;

a first means for applying a first set of transmission signals to the attendant facility under control of the first time-slot storing means;

a second means for applying transmission signals, which are generated in the attendant facility to the first or second call connection under control of the first time-slot storing means; and a third means for applying a second set of transmission signals to the attendant facility under control of the second time-slot storing means.

13. The system as set forth in claim 12 wherein the first time-slot assigning means comprises:

means for storing the first time-slot in the first time-slot storing means; and wherein the converting means comprises:

means for transferring the first time-slot from the first time-slot storing means to the second time-slot storing means.

14. The system as set forth in claim 10 which further comprises means for selectively controlling, in response to the first or the second two-way establishing means, the flow of a first set of transmission signals to the attendant facility and a second set of transmission signals generated by the attendant facility and is fed through the attendant interface circuit to the first or second call connection.

15. The system as set forth in claim 14 which further comprises means for selectively controlling, in response to the one-way establishing means, the flow of a third set of transmission signals from the first call connection to the attendant facility.

* * * * *